United States Patent
Englund et al.

(10) Patent No.: US 8,483,737 B2
(45) Date of Patent: Jul. 9, 2013

(54) RESOURCE ALLOCATION IN UPLINK OFDMA

(75) Inventors: Eva Englund, Linköping (SE); Pål Frenger, Linköping (SE); Kristina Jersenius, Linköping (SE); Ke Wang Helmersson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 349 days.

(21) Appl. No.: 12/991,513

(22) PCT Filed: May 9, 2008

(86) PCT No.: PCT/SE2008/050534
§ 371 (c)(1),
(2), (4) Date: Dec. 17, 2010

(87) PCT Pub. No.: WO2009/136825
PCT Pub. Date: Nov. 12, 2009

(65) Prior Publication Data
US 2011/0275399 A1    Nov. 10, 2011

(51) Int. Cl.
*H04W 72/04* (2009.01)
(52) U.S. Cl.
USPC ............... 455/509; 455/452.1; 455/67.13; 455/452.2
(58) Field of Classification Search
USPC ............ 455/513, 507, 509, 452.1, 452.2, 455/450, 67.11, 522, 69, 67.13; 370/330, 370/329, 295
See application file for complete search history.

(56) References Cited

U.S. PATENT DOCUMENTS

| | | | | |
|---|---|---|---|---|
| 2008/0240022 | A1* | 10/2008 | Yoon et al. | 370/329 |
| 2010/0195614 | A1* | 8/2010 | Nimbalker et al. | 370/330 |
| 2011/0310819 | A1* | 12/2011 | Liao | 370/329 |
| 2012/0128095 | A1* | 5/2012 | Kwon et al. | 375/295 |

FOREIGN PATENT DOCUMENTS
WO    01/93471 A1    12/2001

OTHER PUBLICATIONS

Ofuji, Y. et al. "System-Level Throughput Evaluations in Evolved UTRA." 10th IEEE International Conference on Communications Systems, 2006 (ICCS 2006), Singapore, Oct. 2006.
Wang, A. et al. "A Flexible Bit Allocation Algorithm Based on Adaptive Method for OFDM Channels." International Conference on Wireless Communications, Networking and Mobile Computing, 2007 (WiCom 2007), Sep. 21-25, 2007, pp. 291-294.

* cited by examiner

*Primary Examiner* — John J Lee
(74) *Attorney, Agent, or Firm* — Coats & Bennett, P.L.L.C.

(57) ABSTRACT

A method and arrangement in a node for allocating transmission resources is presented. The present method and arrangement for scheduling, allocates frequency resources based on the received signal power of user equipment. Thus in particular uplink power can be better utilized. According to the present method and arrangement the resource blocks are distributed so that the SINR of all scheduled user equipments reach a selected SINR target. The selection of SINR targets may be static or dynamic. Further, according to the present method and arrangement, optimization of system and user performance may be combined.

18 Claims, 6 Drawing Sheets

RESOURCE ALLOCATION IN UPLINK OFDMA

TECHNICAL FIELD

The present invention relates to a method and an arrangement in a node comprised in a wireless communication network. In particular it relates to a mechanism for scheduling radio frequency resources.

BACKGROUND

Radio access technologies for wireless communication network are continuously being evolved to meet the future demands for higher data rates, improved coverage and capacity. Examples of recent evolutions of the Wideband Code Division Multiple Access (WCDMA) technology are High-Speed Packet Access (HSPA). Currently further evolutions of the 3G systems, 3G Long Term Evolution (LTE), including new access technologies and new architectures are being developed within the 3rd Generation Partnership Project (3GPP) standardization body.

One of the main targets for LTE is that the access technology should be flexible to use in existing frequency allocations and new frequency allocations in order to allow for easy introduction in spectrum with existing deployments. Also, it should be possible to use different duplex solutions. Both Frequency Division Duplex (FDD) and Time Division Duplex (TDD), where up- and downlink are separated in frequency and in time respectively will be supported to provide usage in unpaired spectrum. To allow for flexible spectrum solutions the access technology chosen is based on Orthogonal Frequency Division Multiplexing (OFDM) for the downlink and Single Carrier Frequency Division Multiple Access (SC-FDMA) for the uplink.

The LTE concept supports fast scheduling in frequency and time both for the uplink and the downlink. This means that the resource assignment in time and frequency can be adjusted to the user equipments' momentary traffic demand and channel variations.

In the LTE uplink it is possible to scheduling several user equipments in one Transmission Time Interval (TTI) by assigning different frequency segments to different user equipments. To maintain the single carrier structure, each user equipment can only receive contiguous assignment in frequency. The resource assignment is performed by the scheduler situated in the base station, eNodeB. The scheduler informs the user equipments about the scheduling decision by transmitting grants containing resource assignments on the Physical Downlink Control Channel (PDCCH). A limited number of grants can be transmitted on this channel.

The LTE uplink is almost orthogonal. Due to transmitter and receiver imperfections there may be intra-cell interference in the form of mirror frequency interference and adjacent user equipment interference.

The scheduler manages the radio resource in frequency and time. In each scheduling time interval, the scheduler allocates a number of radio frequency resources to user equipments in the cell. When there are more than one user in the cell, the scheduler may need to solve the following problems and make a scheduling decision: Who or which users are selected to assign the radio frequency resources? How to divide a number of available radio frequency resources among a number selected users? How to place the selected users in frequency bandwidth or which part of frequency band is suitable for which users?

There are commonly used approaches or methods to solve these problems, which are described briefly below. The problems when using these approaches in the uplink scheduler are also addressed.

For the first problem, there are many approaches to select users when to allocate resources. Basically, there are two principles: the random selection or the priority based selection. With the random selection the scheduler selects user randomly when the resources are assigned. The random selection is not much useful when the quality of service (QoS) is a requirement in resource management. The priority based resource allocation is more commonly used approach in wireless communication network. In this approach, the users are queued according to a pre-defined priority weight function. The weight function can take many requirements, such as the QoS, the queuing time and the user throughput, etc., into the consideration. The scheduler selects user equipment one by one from the priority queue.

When a user is selected either randomly or from the priority queue, the scheduler may need to decide how many resources units should be assigned to the selected user. There are mainly two alternatives: either assigns one resource unit per selected user or assigns a number of resource units per selected user. The approach with randomly selected user usually applies the first alternative. This scheduling approach is known to be the Round Robin algorithm: where the scheduler assigns one resource unit to one selected user, and next resource unit to the next selected user until all resources are assigned.

The approach with priority based selection usually applies the second alternative. When the highest prioritized user is selected, the scheduler allocates as many frequency resources as user equipment needs first. If there are more resources left, the scheduler allocates the remaining resources to the second user equipment in the priority queue, and goes on until all resources are assigned.

The random selection approach is not appropriate in the wireless communication network since the QoS is one of the most important requirements when resources are allocated by the scheduler. The priority based approach has been a preferred solution and commonly used by the scheduler in the wireless communication system. It may function in the downlink when the base station has enough power to keep the channel quality. However when applying such an approach in the uplink scheduler, it is no longer appropriate when the power limitation of the user equipment or the impact of transmitter and receiver imperfections are taken into account. The following problems have been observed when this approach is applied in the uplink scheduler:

Firstly, the prioritized user equipment that is scheduled first, with a generous amount of frequency resource units or blocks, may not have enough power to transmit on the assigned resource units. Since the user equipment has to distribute the total transmission power to all assigned frequency resource units. The more assigned resource units the less power can be used on each resource unit, and hence the lower received power density, i.e. received power per frequency unit. Low received power density gives low channel quality; hence poorer channel utilization. This can result in very low throughput and bad performance both on the user equipment and the wireless communication system.

Secondly, when several user equipments are scheduled, the differences in received power density or Signal to Interference and Noise Ratio (SINR) density can be very large between scheduled user equipments. In some cases, the interfrequency interference can be a problem.

For the second problem, the commonly used method to divide a number of available resources to a number of user equipments is to formulate such a problem into an optimization problem, and then solve the optimization problem by searching through all combinations or alternative choices. The searching of an optimal solution can be very time consuming in a large system with many user equipments and many resource units, as the number of possible combinations increase. Similarly, more available resources leads to more combinations. The number of combinations increases exponentially.

In the downlink, when power limitation may not be a big problem and when there may be no restriction on which resource unit can be assigned to the user equipment, the frequency dependent resource allocation can be used to place the selected user in the frequency units with the best radio channel condition. However, the solution is difficult to apply to the uplink scheduler. In the uplink, the user equipments are spread out geographically in a cell. The radio signals sent from the user equipment and received at the base station, i.e. uplink signals can be very different in power strength in different frequency bends, depending on radio propagation conditions such as e.g. the distance, the fast and slow fading between the user equipment and the base station. The received power density, which depends on the transmission power and radio propagation conditions, can be very different for different placement in frequency bands. The user equipment may be power limited in one frequency band placement and not power limited in other frequency bands. Different frequency bands also flaw different channel quality and hence different modulation and coding scheme (MCS) should be used. The user equipment may transmit all data in the data buffer in some frequency band placement and may not be able to transmit all data in other frequency band placement. Moreover, the inter-frequency Interference can also be a problem when two user equipments are placed in the neighbour frequency band with each other, one has a very low received power density, e.g. the user is power limited or data limited, and the other has a very high received power density. There is no systematic method to cover all these aspects in the uplink.

Even if the scheduler is able to find solutions to each problem listed above, the scheduler still needs to put all the solutions together and make a scheduling decision. Since there are interactions and conflictions of the problems, the solution that may solve one of the described problems may not solve the other problems the scheduler has to solve. The scheduler has to go back to find another solution for the solved problem and make a test on the other problems. The process can go on and get more and more complicated, which is not applicable in practice.

SUMMARY

It is therefore an object to provide a mechanism to schedule the frequency resources in a wireless communication network, particular in the uplink.

According to a first aspect, the object is achieved by a method in a first node, for allocating resource blocks to at least one second node. The first node and the second node are comprised within a wireless communication network. The second node is adapted for wireless communication with the first node. The communication is made over a channel by sending data comprised within the allocated resource blocks. The method comprises the step of generating at least one candidate Signal to Interference and Noise Ratio target value. Also, the method comprises the step of estimating the received signal power of each second node, based on measurements made on a signal received from each second node. Further, the method comprises the step of computing the number of resource blocks, possible to allocate to each second node. The computing is made for each generated candidate Signal to Interference and Noise Ratio target value. The computing is based on the estimated received signal power of each second node. The method further comprises the step of selecting a Signal to Interference and Noise Ratio target value out of the candidate Signal to Interference and Noise Ratio target values. Also, the method comprises the step of allocating the computed number of resource blocks to each second node for the selected Signal to Interference and Noise Ratio target value.

According to a second aspect, the object is also achieved by an arrangement in a first node for allocating resource blocks to at least one second node. The first and the second node are comprised within a wireless communication network. The second node is adapted for wireless communication with the first node. The communication is made by sending data comprised within the allocated resource blocks. The arrangement comprises a generating unit. The generating unit is adapted to generate at least one candidate Signal to Interference and Noise Ratio target value. The arrangement also comprises an estimation unit. The estimation unit is adapted to estimate the received signal power of each second node. The estimation is based on measurements made on a signal received from each second node. Further, the arrangement comprises a computing unit. The computing unit is adapted to compute the number of resource blocks possible to allocate to each second node for each generated candidate Signal to Interference and Noise Ratio target value. The computing is based on the estimated received signal power of each second node. Further yet, the arrangement comprises a selecting unit. The selecting unit is adapted to select a Signal to Interference and Noise Ratio target value out of the candidate Signal to Interference and Noise Ratio target values. Still further, the arrangement comprises an allocating unit. The allocating unit is adapted to allocate the computed number of resource blocks to each second node for the selected Signal to Interference and Noise Ratio target value.

An advantage of the present method and arrangement is to provide a systematic way to schedule the frequency resources, particularly in the uplink.

Another advantage of the present method and arrangement is to enable the scheduler to control the level of received power density while allocating the radio frequency resources to the user equipments in the cell.

Yet an advantage of the present method and arrangement is to enable the scheduler to control the level of received Signal to Interference and Noise Ratio density while allocating the radio frequency resource units to the user equipments in the cell.

Another advantage of the present method and arrangement is to provide the scheduler with a scalable optimization formulation while allocating radio frequency resource.

Yet an advantage of the present method and arrangement is to target certain optimization criteria while allocating radio resources. The optimization criteria may be selected depending on focus of the optimization, whether to optimize user performance or system performance. Thereby the overall system resources may be utilized in an optimized way.

Another advantage of the present method and arrangement is that scheduling decision may be made concerning the number of resource blocks to be allocated to each user equipment in a cell, based on the maximum power that is needed on the assigned resource blocks. Thus the frequency resource allocation may be performed together with the uplink power control.

Yet an advantage is that the present method and arrangement have the flexibility to vary the level of received power density or the level of SINR density for different cells in a wireless communication network, different cell loads and different optimization criteria.

BRIEF DESCRIPTION OF THE DRAWINGS

The present invention will now be described more in detail in relation to the enclosed drawings, in which.

DETAILED DESCRIPTION

The invention is defined as a method and an arrangement which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present method or arrangement to any of the particular forms disclosed, but on the contrary, the present method and arrangement is to cover all modifications, equivalents, and alternatives falling within the scope of the invention as defined by the claims.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

Figure 1A:
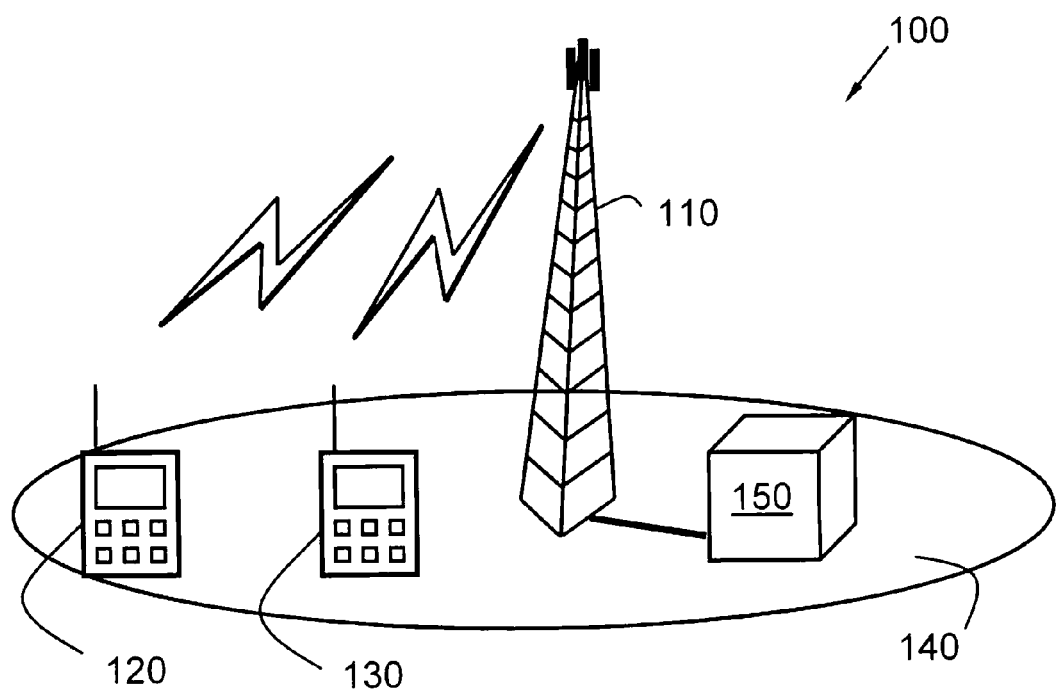
FIG. 1A is a block diagram illustrating embodiments of a wireless communication network.

FIG. 1A depicts a wireless communication network 100 comprising a first node 110, and second nodes 120, 130, which are communicating with the first node 110. The communication between the first node 110 and the second nodes 120, 130 may be made in a cell 140 comprised in the wireless communication network 100.

The first node 110 may in some embodiments be referred to as e.g. a base station, an access point, a Node B, an eNode B and/or a base transceiver station, Access Point Base Station, base station router, etc depending e.g. of the radio access technology used. However, according to some embodiments e.g. when used in a GSM based wireless communication network 100, the first node 110 may be a control node, a base station controller, a radio network controller, a packet control unit, a mobile switching centre or another non mobile node comprised within the wireless communication network 100.

In order to not unnecessarily complicate the understanding of the present methods and arrangements, the expression "base station" will be used in the text of the description for describing the first node 110.

In some embodiments, the second node 120, 130 may be a user equipment e.g. a mobile cellular telephone, a Personal Digital Assistant (PDA), a laptop, a computer or any other kind of device capable of managing radio resources.

According to some embodiments, the situation however is different. According to those embodiments, the second node 120, 130 may be referred to as e.g. a base station, an access point, a Node B, an eNode B and/or a base transceiver station, Access Point Base Station, base station router, etc depending e.g. of the radio access technology used.

However, in this text the term "user equipment" will be used in the description when referring to the second nodes 120, 130 involved when exercising the present methods and arrangements.

The wireless communication network 100 may be based on technologies such as e.g. TD-SCDMA, LTE, GSM, Universal Mobile Telecommunications System (UMTS), Evolved UMTS Terrestrial Radio Access (E-UTRA), Evolved UMTS Terrestrial Radio Access Network (E-UTRAN), High Speed Downlink Packet Data Access (HSDPA), High Speed Uplink Packet Data Access (HSUPA), High Data Rate (HDR) etc.

The present methods and arrangements are applied to any wireless communication network 100 where radio resource in the frequency domain is allocated by the network 100.

The wireless communication network 100 may also comprise a radio resource management unit 150. The radio resource management unit 150 may be e.g. a scheduler. The radio resource management unit 150 may be a governing element in the wireless communication network 100, which may be responsible for the user equipments 120, 130 who are connected to base stations e.g. the first node 110. The radio resource management unit 150 performs radio resource allocation and provides user equipments 120, 130 with transmission permission on when, where and how to transmit. The radio resource management unit 150 may be embodied as an arrangement within the base station 110, or as a separate physical entity, being connected to the base station 110.

Radio signals are sent from the user equipment 120, 130 over a radio link and are received by the base station 110, i.e. uplink signals. Signals may also be sent from the base station 110 to the user equipment 120, 130, i.e. downlink signals.

Figure 1B:
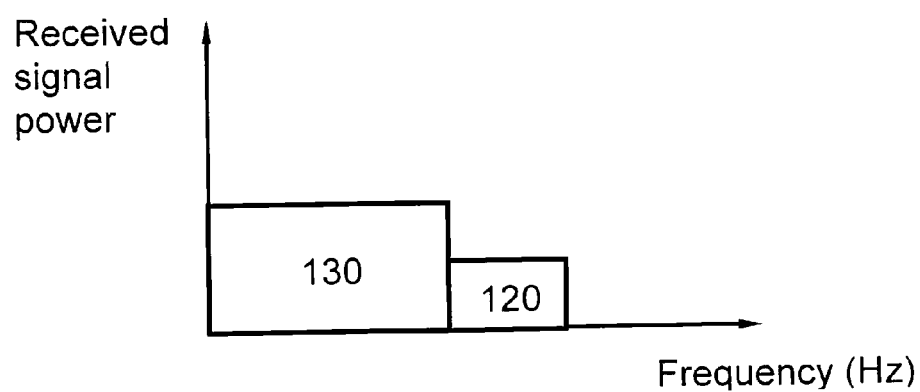
FIG. 1B is a block diagram illustrating the relation between the received signal power and allocated frequency bandwidth according to some embodiments.

FIG. 1B is a block diagram illustrating the relation between the received signal power and allocated frequency bandwidth, according to some embodiments. FIG. 1B may be seen as a snap shot illustrating the general idea of the present methods and arrangements.

The power of the signals sent from the user equipment 120, 130 to the base station 110 may differ depending on radio propagation conditions such as e.g. the distance between the user equipment 120, 130 and the base station 110, the power capacity of the user equipment 120, 130, multi path interference etc.

The general principle of the invention is to allocate more radio transmission resources to a user equipment 130 that have higher received signal power, and to allocate less, or none, radio transmission resources to a user equipment 120 that have lower received signal power.

The present method and arrangement for allocating resource blocks to user equipments 120, 130 takes place at the base station 120. The present methods and arrangements may with particular advantage be used for allocating uplink resources, but may be used also for downlink resource allocation.

The basic principle of the present methods and arrangements is thus the relation between the level of received signal power and the allocated frequency bandwidth. Since the total transmission power is distributed on the whole assigned frequency bandwidth when transmitting data from the user equipment 120, 130, the received signal level becomes lower for a wider allocated frequency bandwidth. The bandwidth comprises a number of frequency units or frequency blocks. The wider the bandwidth is the more frequency resource units are comprised in the bandwidth. Thus, the relation between the received power density, i.e. received power per frequency unit, and the number of frequency resource units is: the more assigned resource units, the lower received signal power density. This relation can also be expressed in terms of the received Signal to Interference and Noise Ratio (SINR) density, that is, the received SINR per frequency units. The received SINR density decreases when the number frequency units that may be assigned to the user equipment 120, 130 increases. The scheduler has the possibility to select the level of received signal power density or SINR density from different user equipment 120,130 by assigning different number of frequency resource units to each respective user equipment 120,130.

Instead of separately solving each problem that the scheduler 150 is facing when allocating resources, a new method and arrangement is presented. The radio resource management unit 150 is redefined by adding a new task, which is normally not included: the radio resource management unit 150 according to the present method and arrangement is set to control and select the level of received signal power density, or, approximately equivalently, control the level of received SINR density, received from different user equipments 120, 130. With this approach, the solution to the various resource allocation problems may be considerably simplified.

When controlling the level of received signal power density, the radio resource management unit 150 may be able to target performance optimization and solve several of the previously described problems associated with resource allocation. For example, the problem that some user equipment 120, 130 may be power limited, while some may be not. The radio resource management unit 150 may assign the number of frequency resources to a user equipment 120, 130 based the received signal power of that user equipment 120, 130. For example, for a user equipment 130 which has good radio conditions, which render high received signal power at the base station 110, more resource blocks, or wider bandwidth, may be assigned. For another user equipment 120 which may have less good radio conditions, leading to lower received signal power, less bandwidth or fewer resource blocks may be assigned. Moreover, by controlling the received power density of different user equipments 120, 130, the inter-frequency interference may be avoided when two user equipments 120, 130 are placed in the neighbour frequency band of each other, as it is illustrated in FIG. 1B. In this example, the received signal power density of two different user equipments 120, 130 may be controlled by the radio resource management unit 150 by allocating different number of frequency resource units or in other words, assigning different bandwidth. In this way the scheduler may target the same received power density or SINR value for all for user equipments 120, 130 within the cell 140.

By controlling the level of received power density, the received SINR level may be controlled so that it does not go below a certain first minimum SINR threshold level, SINR min, when the frequency bandwidth is allocated to the user equipment 120, 130. This may occur considering that some user equipments 120, 130 may be power limited when too many frequency resource units are assigned to them. The radio resource management unit 150 may not assign too many resource units so that the received SINR density becomes lower than the SINR min. In this way, the radio resource management unit 150 may be able to maintain the channel quality and also achieve good channel utilization.

In general, the higher the received SINR density is, the higher order of modulation may be applied and the less coding may be needed when data bits are transmitted in the radio channels. The more information bits that are transmitted in a channel, the more channel efficiency or utilization may be achieved. This may be due to less transmitted overhead and/or redundancy.

However, the wireless communication network 100 may not always support very high order modulations. An example of a high order modulation may be 64 State Quadrature Amplitude Modulation (64 QAM). In such case, there may be no need to target too high SINR density than the highest order modulation require. With this consideration, it may be an advantage to control the received SINR level so that it does not exceed a certain second SINR threshold level, SINR max. To assure an overall system performance and power saving in the user equipment, the received SINR level may be targeted as high as it may be necessary in order to increase the bit rate and thus to achieve good user and system performance.

These first and second threshold levels may be set by the wireless communication network 100, at different values, for different frequency bandwidth that the system is operated with, for different cells 140, and also at different values for a particular cell 140 depending e.g. on the load, time of the day etc.

Since the received signal power and SINR can be calculated for a signal transmitted from one node 120, 130 to another node 110, thus the interference and background noise may be estimated. In order not to unnecessarily complicate the understanding of the present methods and arrangement, the expression "received SINR density" will be used in the rest of the description. However, it is to be noted that it may as well be replaced with the expression "received signal power density".

The radio resource management unit 150 controls the received SINR level so that different user equipments 120, 130 have approximate the same SINR density, and so that it does not go below SINR min and does not exceed SINR max.

Besides the control of the received SINR level, the radio resource management unit 150 has the possibility to select the level of received SINR density within SINR min and SINR max. The selection of SINR level in this approach may be formulated as an optimization problem.

The optimization problem may be formulated by defining two threshold levels and a range of SINR candidates. The first threshold level may be a lower limit of received SINR density, SINR min, and the second threshold level may be an upper limit of received SINR density, SINR max. The range of candidates is a number of received SINR, (SINR 1, SINR 2, . . . , SINR n), within these two thresholds. The candidate SINR values may be evenly distributed within the range, or distributed according to some other arbitrary algorithm. These values are the candidates in the optimization searching process. The optimization aims at finding one SINR among the candidates as the optimal solution. The optimal SINR, or at least a SINR good enough, is selected by the radio resource management unit 150 and used as a targeted SINR level to assign the available frequency resource units to the user equipments, 120, 130, in the cell 140. The SINR min may be selected to be the same value as SINR 1. Similarly, the SINR max may be selected to the same value as SINR n.

To complete the formulation of the optimization problem, some optimization criteria may be defined. Since the main task of the radio resource management unit 150 may be to allocate resources to the user equipments 120, 130. From user point of view, it may be an advantage if the resources are allocated to optimize the user performance, e.g. to minimize the delay at the user equipment 120, 130 and to maximum the user bit rate. From system point of view, it may be advantageously if resources are allocated to optimize the system performance, such as e.g. to optimize channel utilization, to maximize system throughput. In other words, the resources may efficiently be used to transmit as many data bits as possible from all scheduled user equipments 120, 130. Meanwhile, the system may take the quality of service (QoS) and priority of user equipments 120, 130 into the consideration. The resources may be allocated based on the priority of the user equipments 120, 130.

The present method and arrangement provides the possibility to select different optimization criteria. Moreover, the optimization criteria may be selected based on different cell load. The cell load may vary considerably between different cells 140, but also within one cell 140 during different times of the day, different days in the week, different times of the year etc. When the cell load is high, there may be a plurality of user equipments 120, 130 present within the cell 140 simultaneously, that require to be scheduled and more data thus may need to be transmitted on the limited resources. Thus the channel with certain advantage may be utilized efficiently, in order to achieve good performance. Hence the channel utilization may be more important. The optimization criteria may be selected to maximize, or at least increase, system throughput and to optimize, or at least improve, the channel utilization. The received SINR level may be targeted as high as it may be necessary in order to increase the bit rate, and thus to achieve good user and system performance. When the cell load is low, there may be fewer user equipments 120, 130 that require to be scheduled in the cell 140 and/or there may be less data to be transmitted on available resources. In such a scenario, the channel utilization may be less important. Then, the optimization criteria may be selected to improve the quality of service for the user equipment 120, 130, and/or to save power resources for the user equipment 120, 130 and keep interference between the user equipments 120, 130 low. The received SINR level may be targeted as low as possible.

Besides to formulate the optimization problem, the present method and arrangement also provide a systematic approach to search an optimal, or at least an improved solution. The present method and arrangement may comprise a number of steps such as to select user equipments 120, 130 e.g. from a priority list comprising user equipments 120, 130, to which resources may be allocated. Such priority list may be based on quality of service of the respective user equipments 120, 130.

For each SINR level in the range of the SINR candidates, the maximum number of resource blocks that may be allocated to this selected user equipment 120, 130 based on the received SINR of the user equipment 120, 130 and the number of available resource units may be calculated.

Further, the present method and arrangement may comprise an evaluation of the number of information data bits may be transmitted, based on the required modulation and coding scheme. The present method and arrangement may further continue to select the next user equipment 120, 130 in the priority queue, calculate the maximum number of resource units that may be allocated to that user equipment 120, 130, based on the received SINR level of this user equipment 120, 130 and the available resource units left after the resource allocation of the previous user equipment 120, 130. Thereafter, the information data bits that may be transmitted by this second user equipment 120, 130 may be evaluated.

Further, the total number of information data bits for all user equipments 120, 130, to be scheduled, may be accumulated for each SINR candidate.

Also the remaining resource blocks for each SINR candidates may be calculated. The process may be repeated as long as there are remaining resource blocks and more user equipments 120, 130 that require to be scheduled.

When there are no more resource blocks 200, or no more user equipments 120, 130 left, an appropriate SINR level out of the SINR candidates that fulfill the optimization criterion may be selected. If there is more than one SINR levels fulfilling the optimization criterion, the lowest SINR level that fulfills the optimization criterion may be selected.

Thus, the selection of the SINR level in the present method and arrangement comprises the formulation of an optimization problem which considers not only quality of service but also the power limitations and transmitter/receiver imperfections of the user equipments 120, 130, and find an optimal solution that optimize user performance or system performance depending on the focus of the optimization.

When an appropriate solution, i.e. an appropriate SINR target level is found, the number of resource blocks that can be assigned to each scheduled user equipment 120, 130 and the maximum power that can be used on the assigned resource blocks can be calculated. The present method and arrangement thus may combine the frequency resource allocation together with the uplink power control of the user equipments 120, 130, according to some embodiments.

The present method and arrangement provides a scalable optimization problem. The definition of the thresholds, SINR min and SINR max, and the range of the candidates can be adjusted depending on the size of radio communication network. Usually, the number of available frequency resource units increases in a network with a large frequency bandwidth. The wider the frequency bandwidth or the more frequency resources, the wider range of received SINR candidates may be defined. Finding an optimal solution in a wider range of SINR candidates may take some time.

Several alternatives are provided according to the present methods and arrangements, to scale the resolutions of the optimization problem.

According to some embodiments, a method and arrangement is provided in order to scale the formulation of optimization problem. The optimization problem may be scaled down in a large wireless communication network 100 by limiting the number of SINR candidates within the SINR min and SINR max. This may be done either by decreasing the differences between SINR min and SINR max or by reducing the number of SINR candidates when they are defined. The less number of SINR candidates, the less number of candidates that optimization process search through, which leads to a faster process.

According to some embodiments, a method and arrangement is provided to select the optimization searching algorithms, such that the optimal solution may be obtained by a dynamic optimization algorithm. The solution may also be obtained by a less optimal and less dynamic searching algorithm. Different optimization algorithms can be developed based on the principle of the present methods and arrangements. Three algorithms are presented in the subsequent description text and will be described more in detail.

Figure 2:
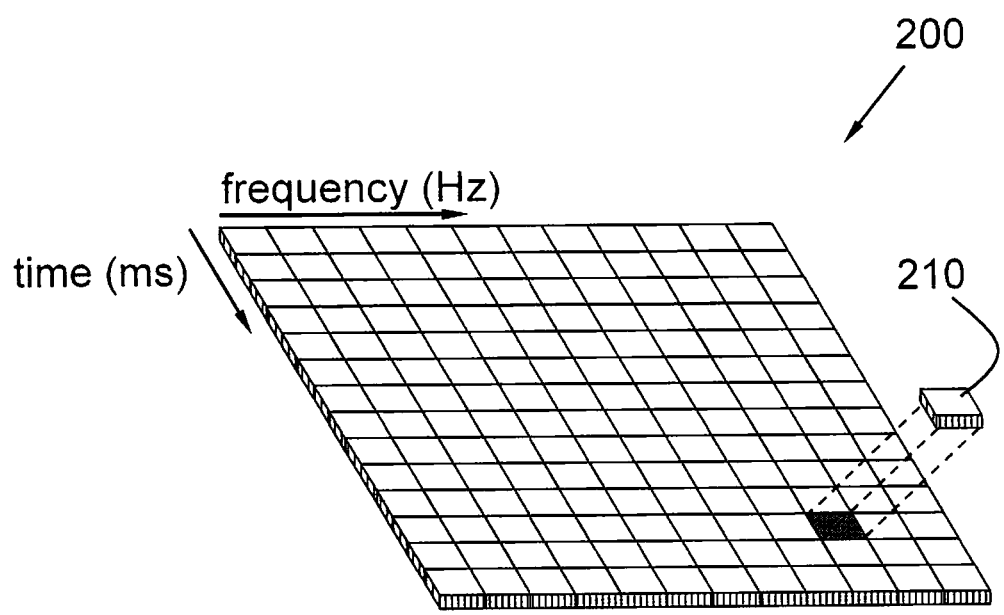
FIG. 2 is a block diagram illustrating embodiments of a resource unit or block.

FIG. 2 illustrates the Long Term Evolution uplink resource block 200, assuming a single transmit antenna, used by the user equipment 120, 130 and the base station 110 when communicating.

A physical resource block 200 in the present context may be defined as a number of consecutive symbols in the time domain and a number of consecutive sub carriers in the frequency domain, as illustrated in FIG. 2. A physical resource block 200 in the uplink thus may comprise resource elements 210, corresponding to one slot in the time domain, sometimes referred to as a Transmission Time Interval (TTI) and e.g. 180 kHz in the frequency domain. In the uplink, when several resource blocks 200 are assigned to one user equipment 120, 130, the resource block 200 may be consecutive in the frequency domain.

Figure 3:
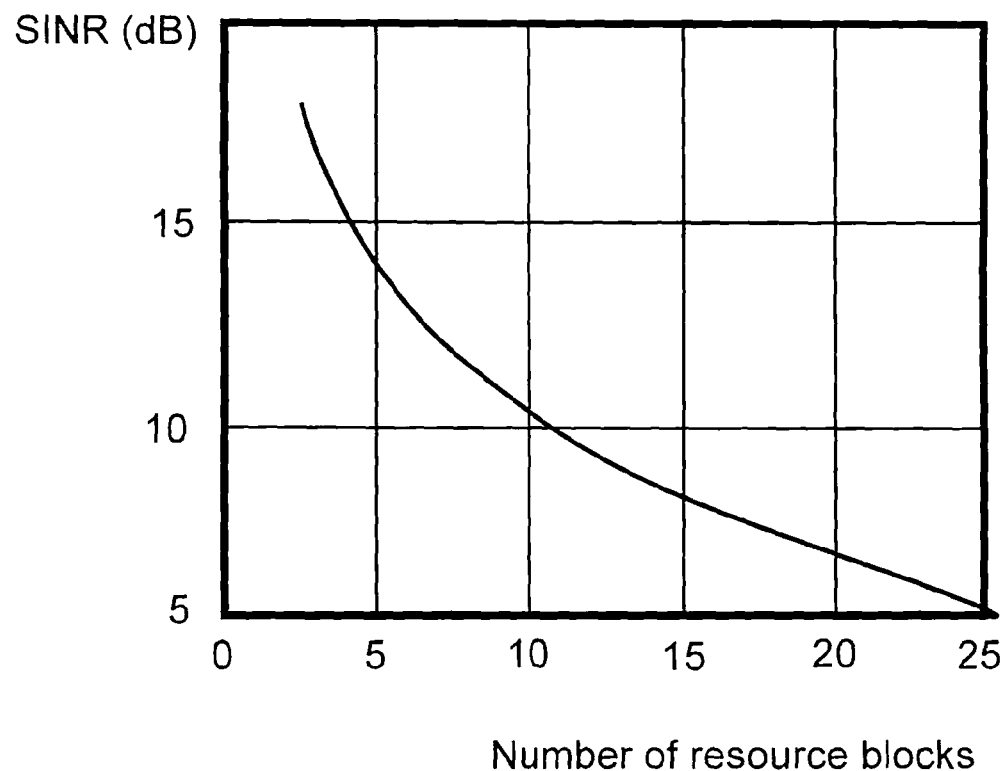
FIG. 3 is a block diagram illustrating the relation between SINR and number of resource blocks according to some embodiments.

FIG. 3 illustrates the relation between SINR and number of allocated resource blocks 200 in the frequency domain, or sub bands as they sometimes also may be referred to, for a user equipment 120, 130. The relation between the maximum level of SINR and number of allocated resource blocks 200 may be expressed as:

$$SINR = \frac{\frac{1}{n}P_{max}G}{I+N}$$

Where $P_{max}$ is the maximum power that the user equipment 120, 130 can transmit radio signals with, G is the path gain between the user equipment 120, 130 and the cell 140 that the user equipment 120, 130 is connected with, n is the number of resource blocks 200 allocated to the user equipment 120, 130, I+N is the interference and background noise. Path gain, or path loss or path attenuation as it also may be referred to, is the reduction in power density, attenuation of a radio signal as it propagates through space from the user equipment 120, 130 to the base station 110, or vice versa. Path gain may be due to various effects and imperfections in the radio propagation conditions such as free-space loss, refraction, reflection, aperture-medium coupling loss, and absorption.

As illustrated in FIG. 3, the selected SINR target value for the user equipments 120, 130 is related to the number of allocated resource blocks 200 for each user equipment 120, 130. The illustrated relation is due to that the transmission power of the user equipment 120, 130, that may be used per resource block 200 decreases when the number of resource blocks 200 increases, as illustrated in FIG. 3.

Figure 4:
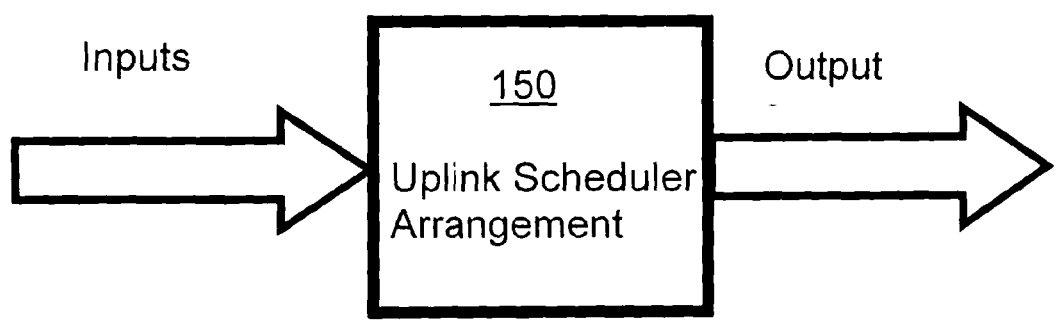
FIG. 4 is a block diagram illustrating an overview of the present method and arrangement, according to some embodiments.

FIG. 4 illustrates an overview of the present scheduling method and arrangement for allocating resource blocks 200.

The present method and arrangement may combine the frequency resource management with the power control of the user equipments 120, 130 by selecting a SNR target for the user equipments 120, 130 to be scheduled in the same Transmission Time Interval (TTI).

The input to the method and arrangement, according to some embodiments, may be e.g. a list of user equipments 120, 130 who have data to transmit in each cell 140, the uplink path gain and buffer status of the user equipments 120, 130 in the list, an estimation of uplink interference and background noise, the available transmission power of the user equipments 120, 130 and the number of available resource blocks 200 in the cell 140.

Figure 5A:
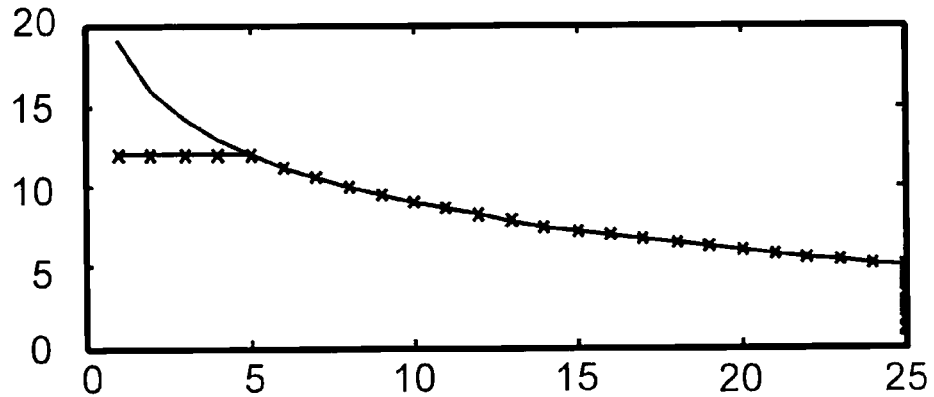
FIG. 5A is a block diagram illustrating an embodiment of the present method and arrangement.
Figure 5B:
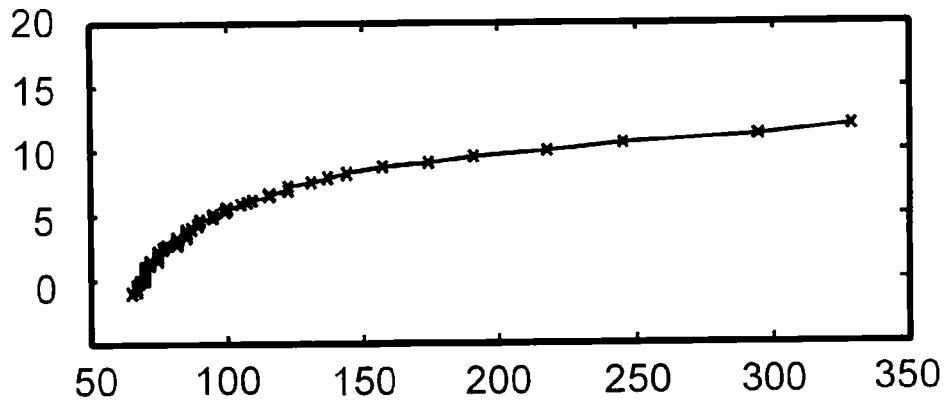
FIG. 5B is a block diagram illustrating an embodiment of the present method and arrangement.

FIGS. 5A and 5B illustrates the connection between SINR level and number of allocated resource blocks and/or info bits, and how candidate values may be selected, according to some embodiments.

In the link adaptation, the modulation and coding rate are selected based on the received SINR level. The present method and arrangement may estimate the modulation and code scheme based on the received SINR level. Based on the modulation and code scheme, the present method and arrangement can estimate the maximum number of information bits to be transmitted per resource block 200. As an example of such estimation, the highest modulation may be assumed to be 16 QAM. QAM, or Quadrature Amplitude Modulation, is a modulation scheme which conveys data by modulating the amplitude of two carrier waves. These two waves are out of phase with each other by 90° and are thus called quadrature carriers, hence the name of the scheme.

The maximum number of information bits that may be transmitted per resource block 200 for different SINR target levels may be calculated. Also, according to the present method and arrangement, the number of resource blocks 200 may be assigned to the user equipment 120, 130 for different SINR target levels may be estimated. Hence the total number of bits that the user equipment 120, 130 can transmit on the assigned resource blocks 200 for different SINR target levels may be estimated, as illustrated in FIG. 5B.

According to the present method and arrangement, the level of the SINR target from different user equipments 120, 130 may be selected when they are assigned the resource blocks 200. The selection of the SINR target level may be adjusted to target different optimization criteria. For example, a user equipment 120, 130 in the cell 140 may have the SINR level as illustrated in FIG. 3. To achieve the best channel utilization, the present method and arrangement may target the received SINR level at 12 dB, which in this example is the lowest SINR level for which the highest number of information bits per resource block 200 may be reached, based on the modulation and code scheme table used by the link adaptation.

To achieve the best user performance in terms of total number of information bits transmitted on a number of resource blocks 200, the present method and arrangement may reduce the SINR target level to allocate more resource blocks 200 to the user equipment 120, 130. If a received SINR level at 5 dB is targeted in the above described example, all 25 resource blocks 200 may be allocated to the user equipment 120, 130, see FIG. 5A.

To achieve low power consumption at the user equipments 120, 130 and also to achieve low interference between different user equipments 120, 130, the present method and arrangement may select an even lower SINR level to target, such as e.g. at 0 dB. There is no gain in terms of bits, but the interference and power consumption may be reduced.

If there are more than one user equipment 120, 130 in the cell 140 that require to be scheduled, which may be assumed to be the normal situation in an average cell 140, the present method and arrangement may select the SINR level so that a plurality of user equipments 120, 130 may be scheduled, to achieve a maximum cell throughput, thereby increasing the system capacity.

The outputs from the present method and arrangement may be, according to some embodiments: the scheduled user equipments 120, 130, the number of bits each scheduled user equipment 120, 130 can transmit, the power that may be required at each scheduled user equipment 120, 130 for transmitting the scheduled data. Also, optionally, in case the scheduled user equipment 120, 130 has too much transmission power in relation to the transmitted data and/or allocated resource blocks 200, power control may be performed such that the transmission power of the user equipment 120, 130 may be reduced.

The list of user equipments 120, 130 provided as an input to the scheduling method may be established in order of scheduling priority based on quality of service. This may be exemplified in an example, e.g. two user equipments 120 and 130 may have data to transmit in the cell 140. The user equipment 120 may in this example have a higher quality of service priority than the user equipment 130, thus the user equipment 120 should be scheduled first. The list of user equipments 120, 130 then becomes: {120,130}.

According to the present method and arrangement, an optimization algorithm may run in an iterative scheduling loop. The optimization may be made in order to achieve a certain obtained optimization criterion, by selecting a SINR level to be targeted. For the selected SINR level, the scheduling decision may be made on the number of resource blocks 200 to be allocated for each user equipment 120, 130.

According to some embodiments, the SINR target may be chosen based on an optimization algorithm with the consideration of any, some or all of the following criteria:

The highest prioritized user equipment 120, 130 may be assigned from one and up to the maximum number of resource blocks 200 based on the path gain of the user equipment 120, 130 and data in the buffer.

An appropriate SINR target and corresponding transport format may thus be selected.

For the selected SINR target, the rest of the available resource blocks 200 may be assigned to the other user equipments 120, 130 in the cell 140 if the highest prioritized user equipment 120, 130 cannot use all the available resource blocks 200, due to e.g. lack of power or lack of data.

Transport format indicator and number of allocated resource blocks 200 may be signalled to the scheduled user equipments 120, 130.

Assuming that a transport format table which comprises the SINR target requirement for the number of information bits can be transmitted based on the modulation and coding scheme which may be available at each user equipment 120, 130, respectively. The user equipment 120, 130 which receives the transport format indicator may then calculate the power required for the given transport format.

According to some embodiments of the present method and arrangement, the SINR target level instead may be selected in advance or pre-determined as a static input parameter, based on certain optimization criteria. Thereby the method and arrangement may be simplified to some extent. However, also in embodiments where the SINR level is pre-determined, the scheduling loop may basically be the same where the resource blocks 200 are allocated to user equipments 120, 130 in the cell 140 based on the pre-selected SINR target level rather than the SINR target level resulted from the previously described optimization algorithm. The scheduling decision on the resource allocation may not be optimal in terms of optimization criteria but the algorithm may be easier to implement. However, it may be difficult to pre-define a suitable SINR level for all cells 140 in the wireless communication network 100, since the number of user equipments 120, 130 in the cell 140 and the cell load may vary from time to time and also be different for different cells 140. The resource block allocation on the frequency band may be fragmented if retransmissions are carried out on the assigned transmission bandwidth. There may be a desire to adaptively adjust the pre-selected SINR target level to a more suitable level, which may also be performed according to some embodiments.

The three conceptual approaches of selecting the SINR target value according to some embodiments, dynamical selection of SINR target, static selection of SINR target and adaptive selection of SINR target will now be explained more in detail.

Dynamical Selection of SINR Target

The scheduling algorithm with a dynamic selection of SINR target may be divided into two parts: an optimization algorithm where the optimal SINR target is selected based on a given optimization criterion and the resource allocation for the selected SINR target. The scheduling algorithm is described below.

Firstly a number of initial values have to be obtained, before the scheduling calculation may begin. Two such initial values are to obtain minimum and maximum SINR threshold level values. These values may be pre set differently in different cells 140.

Thereafter, a range of possible SINR target candidates within the minimum and maximum SINR targets may be selected. Also, the available resource blocks 200 that may be used for each SINR target candidate may be obtained. Further, a maximum allowed transmission power of the user equipment 120, 130 may be obtained. Further yet, the number of available uplink grants which may be used for each SINR target candidate may be obtained. Still further, an optimization criterion, e.g. to maximize cell throughput, or to maximize user throughput of the highest prioritized user may be obtained.

The scheduling and allocation of resource blocks 200 may comprise a number of steps such as to select the user equipment 120, 130, e.g. from the priority list comprising user equipments 120, 130. The priority list may be based on quality of service of the respective user equipments 120, 130. Based on the SINR of the selected user equipment 120, 130, the maximum number of resource blocks 200 for each SINR target candidate may be calculated.

Further, the modulation and coding scheme for each SINR target candidate may be estimated and the number of information bits for the selected modulation and coding scheme may be calculated.

Based on the buffer status of the user equipment 120, 130, a transport format that may be appropriate for the buffer size may be selected and the candidate number of resource blocks 200 for each SINR target candidate may be selected.

Then the total number of information bits that the selected user equipment 120, 130 can transmit for each SINR target candidate may be calculated. Further, the total number of resource blocks 200 for all user equipments 120, 130 to be scheduled may be accumulated. Also, the remaining resource blocks 200 for each SINR target candidate may be calculated. Further, the total number of scheduled user equipments 120, 130 may be calculated. Further yet, the number of remaining grants for each SINR target candidate may be calculated. Thereby the total number of information bits for all selected user equipments 120, 130 may be accumulated.

These steps may be repeated if there are remaining resource blocks 200, remaining grants and more user equipments 120, 130 that require to be scheduled. When there are no more resource blocks 200 or no more user equipments 120, 130 left, a number of scheduling decisions may be performed. These scheduling decisions may be to select an appropriate SINR target out of the SINR target candidates that fulfil the optimization criterion. If there is more than one SINR targets, the lowest SINR target that fulfils the optimization criterion may be selected.

For the selected SINR target it may be decided the number of user equipments 120, 130 to be scheduled, the number of resource blocks 200 for each scheduled user equipment 120, 130 and the number of information bits that can be transmitted by each scheduled user equipment 120, 130.

Also, the transmitting power level of each scheduled user equipment 120, 130, in case the user equipment 120, 130 has more power for the given resource blocks 200 may be determined, e.g. according to the algorithm:

$$p_k = \frac{n_k \cdot SINR_{target}(I+N_0)}{G_k}, k = 1, 2, \ldots m$$

Where P is the power that the user equipment 120, 130 can transmit radio signals with, G is the path gain between the user equipment 120, 130 and the cell 140 that the user equipment 120, 130 is connected with, n is the number of resource blocks 200 allocated to the user equipment 120, 130, I+N is the interference and background noise.

The scheduling decision also provides the power required for the assigned resource blocks 200, which may be given in by the algorithm above. In most of cases, the scheduled user equipments 120, 130 may transmit with their maximum power since the radio resource management unit 150 tries to allocate as many resource blocks 200 as possible based on the maximum transmission power of the user equipment 120, 130. However, there may occur situations for which power control or power reduction may be applied for the scheduled user equipment 120, 130, e.g. when the available resource blocks 200 that may be assigned to the user equipment 120, 130 are less than the number of resource blocks 200 that user equipment 120, 130 can transmit with the maximum power. Another example may be when the available data in user equipment 120, 130 buffer is not enough to fill the number of resource blocks 200 that may be provided to the user equipment 120, 130. In both the described cases, the power required for transmitting on the allocated resource blocks 200 may be estimated based e.g. on the above presented algorithm.

The scheduling algorithm with a dynamic selection of SINR target provides the possibility to select the level of received SINR target on the fly. It also has the flexibility to vary the level of SINR target for different cells 140 in a wireless communication network 100, different cell loads and different optimization criteria. However, the optimization calculation may be heavy for a broad bandwidth with a large amount of SINR target candidates. The scheduling algorithm may be scaled to select less number of SINR target candidates, less optimal and/or to be less dynamic when the SINR target is selected. One simplified solution may be to select SINR target in advance by a pre-defined static parameter from the system, which will be described more in detail below.

Static Selection of SINR Target

According to some embodiments of the present method and arrangement for allocating resource blocks 200 may be performed without using the above described optimization algorithm to select a SINR target. Instead, a pre-defined, static SINR target may be obtained e.g. as a system parameter. The previously described scheduling algorithm may be used when the resource blocks 200 are allocated. Thus the SINR target parameter may be a fixed parameter according to some embodiments, and only the calculation of the number of resource blocks for the given SINR target may be performed, for each user equipment 120, 130.

Thus the amount of initial values that has to be obtained, before the scheduling calculation may begin may be reduced. The pre-defined SINR target may thus be obtained. Also, the available resource blocks 200 that may be used for the SINR target may be obtained. Further, the maximum transmission power of the user equipment 120, 130 may be determined. Also, the available number of grants may be obtained.

The scheduling and allocation of resource blocks 200 may comprise a number of steps such as selecting the user equipment 120, 130 from the prioritized list, which prioritized list may be organized in prioritizing order according to quality of service. Based on the received SINR of the user equipment 120, 130, the maximum number of resource blocks 200 that may be assigned for the user equipment 120, 130 may be calculated. Also the modulation and coding scheme appropriate to use for the selected SINR target may be estimated and the number of information bits for the selected modulation and coding scheme may be calculated.

Based on the buffer status of the user equipment 120, 130, a transport format that may be appropriate for the buffer size and the number of resource blocks 200 may be selected. Thus the total number of information bits that the user equipment 120, 130 can transmit for the SINR target then may be calculated. Also, the total number of resource blocks 200 for all user equipments 120, 130 to be scheduled may be accumulated. Further the allocation of the remaining resource blocks 200 may be calculated. Further yet, the total number of information bits for all the selected user equipments 120, 130 may be accumulated. Also, the total number of scheduled user equipments 120, 130 and the remaining number of grants may be calculated.

These scheduling steps may be repeated if there are more resource blocks 200 available, more available grants and/or more user equipments 120, 130 want to be scheduled.

When there are no more resource blocks 200 or no more user equipments 120, 130 left, a number of scheduling decisions may be made. The number of user equipments 120, 130 to be scheduled, the number of resource blocks 200 for each scheduled user equipment 120, 130 and the number of information bits that can be transmitted by each scheduled user equipments 120, 130 may be determined.

The transmitting power level for each scheduled user equipment 120, 130 in case the user equipments 120, 130 has more power for the given number of resource blocks 200 may be adjusted, according to the algorithm:

$$p_k = \frac{n_k \cdot SINR_{target}(I+N_0)}{G_k}, k = 1, 2, \ldots m$$

Where P is the power that the user equipment 120, 130 can transmit radio signals with, G is the path gain between the user equipment 120, 130 and the cell 140 that the user equipment 120, 130 is connected with, n is the number of resource blocks 200 allocated to the user equipment 120, 130, I+N is the interference and background noise.

Adaptive Selection of SINR Target

The previously described scheduling algorithm with a dynamic selection of SINR target, provides an optimal selection of SINR target for the given optimization criterion. The target may be adjusted automatically for different cell load scenarios via an optimization searching process, where the algorithm searches through a range of candidate SINR target and finds one SINR target that optimizes criterion. The searching process may however be heavy, in particular for a large bandwidth with a large number of SINR candidates.

The above described scheduling algorithm with static selection of the SINR target provides a scheduling decision based on a predetermined estimation of the SINR target level. It may however be difficult to find one SINR target level which suits for all cell load situations.

One third solution, which may be considered a compromise between the dynamic and the static approach, may be to adaptively adjust this pre-defined SINR target so that the selected SINR target suits for the time varying cell load scenarios. Moreover, in the case when a channel dependent resource allocation is performed, or in the case when a retransmission can only be carried out on the assigned transmission bandwidth, the fragmentation of the frequency bandwidth can be avoided by making an adaptive selection of SINR target.

The algorithm of adaptive selection of SINR target is described below. Firstly a number of initial values may be obtained, such as the initial SINR target, the total number of available resource blocks 200 that may be allocated for the user equipments 120, 130 may be calculated, as well as the maximum transmission power of the user equipments 120, 130 and the available number of grants.

The scheduling loop comprises five procedures; assignment of resource blocks 200, checking the availability of adjacent resource blocks 200, shifting and reassigning resource blocks 200, selection of initial SINR target and adjustment of SINR target. These five procedures will now be described more in detail.

Procedure 1, Assignment of Resource Blocks 200

For an obtained SINR target, a user equipment 120, 130 may be selected from the prior list. Based on the SINR of the user equipment 120, 130 for each available resource block 200, the best resource block 200, or at least a good enough resource block 200 may be identified, that can be assigned to the user equipment 120, 130. The modulation and coding scheme may then be estimated, based on the SINR of the assigned resource block 200. Also the number of information bits for the selected modulation and coding scheme may be calculated. While the user equipment 120, 130 has more data to transmit and the adjacent resource block 200 is available, it may be determined if the SINR target may still be reached by adding the best available adjacent resource block 200. If so, the best available adjacent resource block 200 may be allocated to the user equipment 120, 130. Otherwise, the procedure may be repeated from the beginning by selecting the next user equipment 120, 130, e.g. from the prior list. The procedure may also be repeated as long as there are more resource blocks 200 available, more grants available and/or more user equipments 120, 130 that want to be scheduled.

Procedure 2, Checking the Availability of Adjacent Resource Blocks 200

There may be two situations, wherein the adjacent resource block 200 may be considered to be available. Firstly when the adjacent resource block 200 is free and may be assigned to a new user equipment 120, 130. Secondly, when the adjacent resource block 200 is occupied but it may be possible to make it available by the shifting and reassigning procedure to release the resource block 200.

Procedure 3, Shifting and Reassigning Resource Blocks 200

The shifting and reassigning procedure may be used when the resource band is fragmented and a new user equipment 120, 130 has enough data and power to be assigned more resource blocks 200 than the already assigned bandwidth. The procedure starts with selecting a preferred adjacent resource block 200 for the new user equipment 120, 130, either on the left or right. The preferred resource block 200 can be one with a higher SINR. If the user equipment 120, 130 who occupies the resource block 200 can be shifted one step, either on the left or right, on the assigned bandwidth without reducing the total number of bits to be transmitted, the resource block 200 may be shifted and reassigned to the user equipment 120, 130 which can make the shift. Also, the best available adjacent resource block 200 may be added to the new user equipment 120, 130.

Procedure 4, Selection of Initial SINR Target

The selection of the initial SINR target may be based on the number of user equipments 120, 130 in the cell 140, data in transmit buffers and the Gain to Interference and Noise Ratio of the user equipments 120, 130. More specifically, if the minimum of number of user equipments 120, 130 with data to transmit and the number of available grants exceeds a threshold value, the initial SINR target may be set to the maximum SINR target value. If the total amount of data is less than a certain threshold value, the initial SINR target may be set to the maximum SINR target value. Further, if the average Gain to Interference and Noise Ratio of the user equipments 120, 130 exceed a certain threshold value, the initial SINR target may be set to the maximum SINR target value.

Otherwise, the initial SINR target may be selected to be less than the maximum SINR target value. This may be done by mapping the average Gain to Interference and Noise Ratio to the SINR target.

Procedure 5, Adjustment of SINR Target

The SINR target selected according to the initial selection procedure can be too high for some user equipments 120, 130, and the resource band may not be fully utilized when the SINR target is set too high. The adjustment procedure provides an adjustment of the initial SINR target based on the user equipments 120, 130 and the cell load situations in a time varying environment.

Firstly, the resource block 200 may be allocated to the user equipment 120, 130 according to the previously described procedure for assignment of resource blocks 200, for a given SINR target. If there are resource blocks 200 left and more data to transmit when all user equipments 120, 130, which e.g. may be placed in a prior list, are scheduled or when there are no more available grants, the SINR target may be decreased. This procedure may be iterated until the SINR target is set to the minimum SINR target, or until there are no more resource blocks 200 left, or until there is no more data left to transmit.

Thus, instead of finding an optimal SINR target from a waste range of possible SINR targets as previously described, the adaptive selection of SINR target may start with one initial, predetermined, SINR target value, which value may be adjusted by some adaptive adjustment of the SINR target to fill up the available resource blocks 200 in the total bandwidth.

Example Illustrating the Scheduling Algorithm

The present method and arrangement for scheduling resources may be illustrated by an example. In this illustrating, non limiting example, it is assumed that there are two user equipments 120, 130 in the cell 140, that require to be scheduled. The user equipment 120 may have the highest priority of the two user equipments 120, 130.

The SINR of the user equipment 120 for an increasing number of resource blocks 200 may be calculated based on the previously presented equation:

$$SINR = \frac{\frac{1}{n}P_{max}G}{I+N}$$

Some SINR target candidate values are indicated in the diagram presented in FIG. 5A.

A number of initial values may firstly be obtained, such as the minimum and maximum SINR targets. In this example, the minimum SINR target is set to 1 dB and the maximum SINR target is set to 20 dB.

The number of available resource blocks 200 may be determined to be 25, which may be the case e.g. when transmitting 5 MHz bandwidth.

Further, the maximum allowed transmit power of the user equipment 120, 130 may be determined to be 0.25 W. Thus Pmax=0.25 W.

A range of SINR target candidates may be selected where SINR target 1 may be set to the minimum SINR target 1 dB and the highest SINR target candidate may be set to 12 dB, and a number of SINR target candidate values in between as indicated in FIG. 5A. Note that the highest SINR target candidate is set to 12 dB with the consideration that there may be no gain to set the SINR higher than 12 dB when the highest modulation is 16 QAM.

For each candidate SINR level, the maximum number of information bits that can be transmitted per resource block 200 may be estimated, based the modulation and coding scheme used in the link adaptation. This is illustrated in the plot in FIG. 5B.

FIG. 5A together with FIG. 5B depicts the relation between the candidate SINR values of the user equipment 120 versus the number of resource blocks 200 and the number of information bits per resource block 200 for optimal selected modulation and coding scheme.

Thereafter, a scheduling loop may be initiated. The first user equipment 120 in the prior list may be selected and it may be calculated how many resource blocks 200 that user equipment 120 can be assigned for each SINR target candidate. It may also be estimated which modulation and coding scheme to be used for each SINR target candidate. Based on the selected modulation and coding scheme for each SINR target, the number of information bits that can be transmitted per resource block 200 may be calculated.

The scheduling loop continues to the second user equipment, user equipment 130, in the cell 140. For each SINR target in the range, the number of resource blocks 200 that are possible to allocate to the second user equipment 130 may be calculated similarly with the previously made calculation for the first user equipment 120.

The number of resource blocks 200 that are possible to allocate to the second user equipment 130 for the whole range of SINR target candidates may be added together with the previously allocated resource blocks 200 for the first user equipment 120. The estimated total number of information bits that the second user equipment 130 can transmit with the number of resource blocks 200 to be allocated may also be accumulated with the previously calculated estimation made for the first user equipment 120. If there is no more user equipment 120, 130 in the cell 140 that require to be scheduled, a number of scheduling decisions may be made.

The first scheduling decision may be to select SINR target from the range of candidate SINR targets, based on certain optimization criterion. One such criterion may be to maximize the system throughput. Another criterion may be to maximize the throughput of the prioritized first user equipment 120. There may however also be other optimization criterions to target as previously discussed.

In order to maximize the system throughput, the SINR target may be set to 6.5 dB. The first user equipment 120 can be assigned up to 18 resource blocks 200 and the second user equipment 130 may be assigned 6 resource blocks 200. Thus the first user equipment 120 may transmit 2070 information bits for 18 resource blocks 200 the second user equipment 130 may transmit 690 information bits for 6 resource blocks 200.

The transmit power of the first user equipment 120 may be set to the maximum transmit power limit value 0.25 W. The transmit power of the second user equipment 130 may be set to 0.23 W.

To maximize the throughput of the first user equipment 120, a different approach may be made. The SINR target may be set to 5.2 dB. The first user equipment 120 may then be assigned up to 24 resource blocks 200 while the second user equipment 130 may be assigned 1 resource block 200. Thus the first user equipment 120 may transmit 2376 information bits for 24 resource blocks 200 the second user equipment 130 may transmit 99 information bits for 1 resource block 200.

The transmit power of the first user equipment 120 may be set to the maximum transmit power limit value, 0.25 W. The transmit power of the second user equipment 130 may be set to 0.03 W.

It may be noted that for the selected SINR target=5.2 dB, the second user equipment 130 has enough transmit power for 8 resource blocks 200, however there is only 1 resource block 200 left after the first user equipment 120 has been assigned 24 resource blocks 200. Thus some power control, or reduction of the transmit power of the second user equipment 130 may be required in this case.

If there are more user equipments 120, 130 that require to be scheduled in the cell 140, the scheduling loop continues with the next user equipment 120, 130 in the prior list. The scheduling decision may be made after going through all user equipments 120, 130, e.g. in the priority list, or until all resource blocks 200 are filled.

Figure 6:
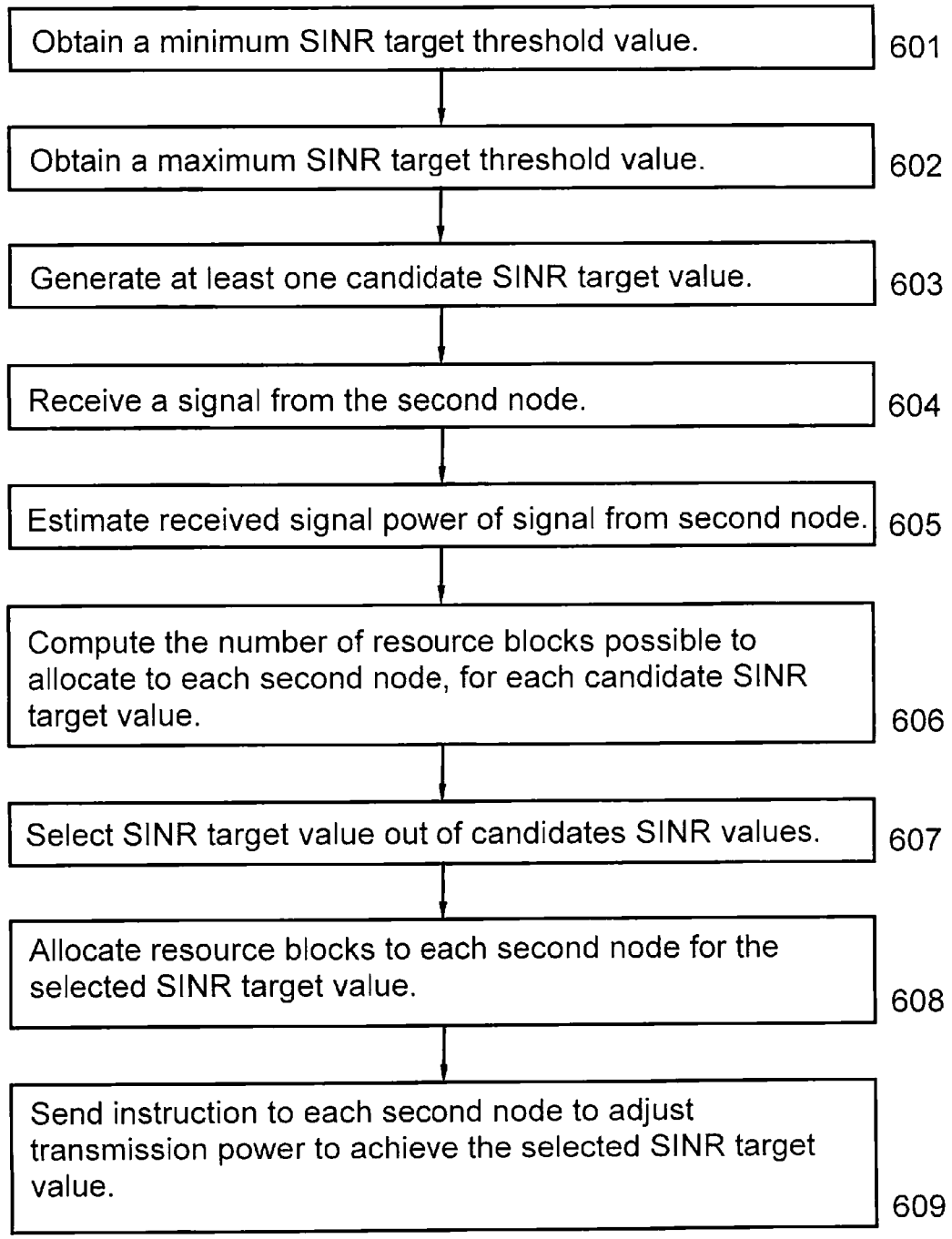
FIG. 6 is a flow chart illustrating method steps according to some embodiments.

FIG. 6 is a schematic flow chart illustrating the method in the first node 110 for allocating resource blocks 200 to at least one second node 120, 130 within a cell 140 in a wireless communication network 100. The first node 110 may be represented by a base station. The second node 120, 130, which may be represented by a user equipment such as e.g. a portable communication device, is adapted for wireless communication with the first node 110. The communication is performed over a channel by sending data comprised within the allocated resource blocks 200.

To appropriately allocate resource blocks 200 to a user equipment 120, 130 within the cell 140, the method may comprise a number of steps 601-609. It is however to be noted that some of the described method steps are optional and only comprised within some embodiments. Further, it is to be noted that the method steps 601-609 may be performed in another chronological order than the enumeration indicates and that some of them, e.g. step 601 and step 602, or even all steps may be performed simultaneously or in an altered, arbitrarily rearranged, decomposed or even completely reversed chronological order. The method may comprise the following steps:

Step 601

A minimum SINR target threshold value is obtained.

Step 602

A maximum SINR target threshold value is obtained.

According to some optional embodiments, the obtained minimum SINR target threshold value and the obtained maximum SINR target threshold value are identical.

According to some embodiments, the minimum and maximum SINR target threshold value may be a system parameter, set by a node comprised within the wireless communication network 100. According to some embodiments, the minimum and maximum SINR target threshold value may be set by each base station to a value which is base station dependent. According to some embodiments, the minimum and maximum SINR target threshold value may be set dynamically and may vary e.g. depending on the cell load, the time of the day, the day of the week, the time of the year etc.

Step 603

At least one candidate SINR target value is generated.

According to some optional embodiments, the at least one candidate SINR target value may be generated without exceeding the obtained maximum SINR target threshold value or falling below the obtained minimum SINR target threshold value.

According to some optional embodiments, the number of generated candidate SINR target values may be based on the number of available resource blocks 200.

According to some optional embodiments, the generation of a SINR target value may be based on at least one parameter out of the group: the number of second nodes 120, 130 within a cell 140, the time of the day, the amount of data that is transmitted, the expected amount of data that is to be transmitted, the number of privileged second nodes 120, 130 within a cell 140, the radio conditions of the second node 120, 130 etc.

Step 604

According to some optional embodiments, a signal from the second nodes 120, 130, which have data to send, may be received at the first node 110.

According to some optional embodiments, the second node 120, 130 may be selected from a list of second nodes 120, 130. Thus such a list previously may have been compiled by the first node 110. The selection of the second nodes 120, 130 from the list of second nodes 120, 130 may according to some embodiments be performed in quality of service priority order of the second nodes 120, 130. Thus the second node 120, 130 within the cell 140 with highest priority order may be situated first in the list, the second node 120, 130 with the second highest priority may be situated secondly in the list, etc.

Step 605

The received signal power of each second node 120, 130, is estimated based on measurements made on a signal received from each second node 120, 130.

According to some embodiments, the respectively radio propagation conditions of the second nodes 120, 130 may be obtained. The radio propagation conditions may, according to some embodiments be the received transmission power of each second node 120, 130. According to some embodiments, the radio propagation conditions may comprise the uplink path gain of each second node 120, 130. The radio propagation conditions may comprise the uplink interference and background noise level of each second node 120, 130, according to some embodiments.

The radio propagation conditions of the second nodes 120, 130 may optionally be obtained e.g. by receiving a pilot signal such as e.g. a Sound Reference Signal (SRS), or similar pilot signal, from each second node 120, 130, to be received by the first node 110. By comparing the received pilot signal with pre stored values, the radio propagation conditions of each second node 120, 130 may be determined by the first node 110.

Step 606

The number of resource blocks 200, possible to allocate to each second node 120, 130, are computed for each generated candidate SINR target value, based on the estimated received signal power of each second node 120, 130. Thus each different candidate SINR target value may correspond to a different candidate number of resource blocks 200, may be allocated to each candidate second node 120, 130, provided that candidate SINR target value is selected in a selection step.

According to some embodiments, the SINR target value may be obtained by performing optimization calculations on a plurality of candidate SINR target values. However, according to some optional embodiments, the SINR target value may be pre set by the system. According to some embodiments, the SINR target value may be a pre set value set by the system, but which SINR target value may be adjusted by the first node 110 by performing calculations.

The number of resource blocks 200 that may be allocated to the second node 120, 130 may be computed, based on the radio propagation conditions of the selected second nodes 120, 130. Thereby the second nodes 120, 130 with good radio propagation conditions may be allocated more resources than the second nodes 120, 130 with poorer radio propagation conditions, which may lead to better system utilization of resources.

Step 607

A SINR target value out of the candidate SINR target values is selected.

According to some optional embodiments, the selection of a SINR target value may be performed in order to achieve at least one objective out of the group: improve channel utilization, improve the throughput of the system, reduce user delay on the second node 120, 130, save power resources on the second node 120, 130, reduce signal interference, increase the bit rate, prioritise certain second nodes 120, 130.

Step 608

The computed number of resource blocks 200 are allocated to each second node 120, 130 for the selected SINR target value. Thus the previously made candidate allocation scenario for the selected SINR target value is selected and realised.

According to some optional embodiments, the step of allocating the computed number of resource blocks 200 to each second node 120, 130 for the selected SINR target value further comprises determining if there is more data for the second node 120, 130 to allocate. If it is, it may be determined if a resource block 200 adjacent to the allocated resource block 200 is available. If it is, it may be determined if the selected SINR target value is reached by allocating also the adjacent resource block 200 to the second node 120, 130. If it is, also the adjacent resource block 200 may be allocated to the second node 120, 130.

According to some embodiments, if the adjacent resource block 200 is occupied, it may be computed if the second node 120, 130, occupying the resource block 200 can be shifted without reducing the total number of bits to be transmitted. If it can, the resource block 200 may be shifted for that second node 120, 130.

Step 609

This step is optional. According to some embodiments, an instruction is sent to each second node 120, 130, to adjust the transmission power of the second node 120, 130 in order to achieve the selected SINR target value.

Thereby the power control of the second nodes 120, 130 comprised within the cell 140 may be combined with the resource allocation.

Figure 7:
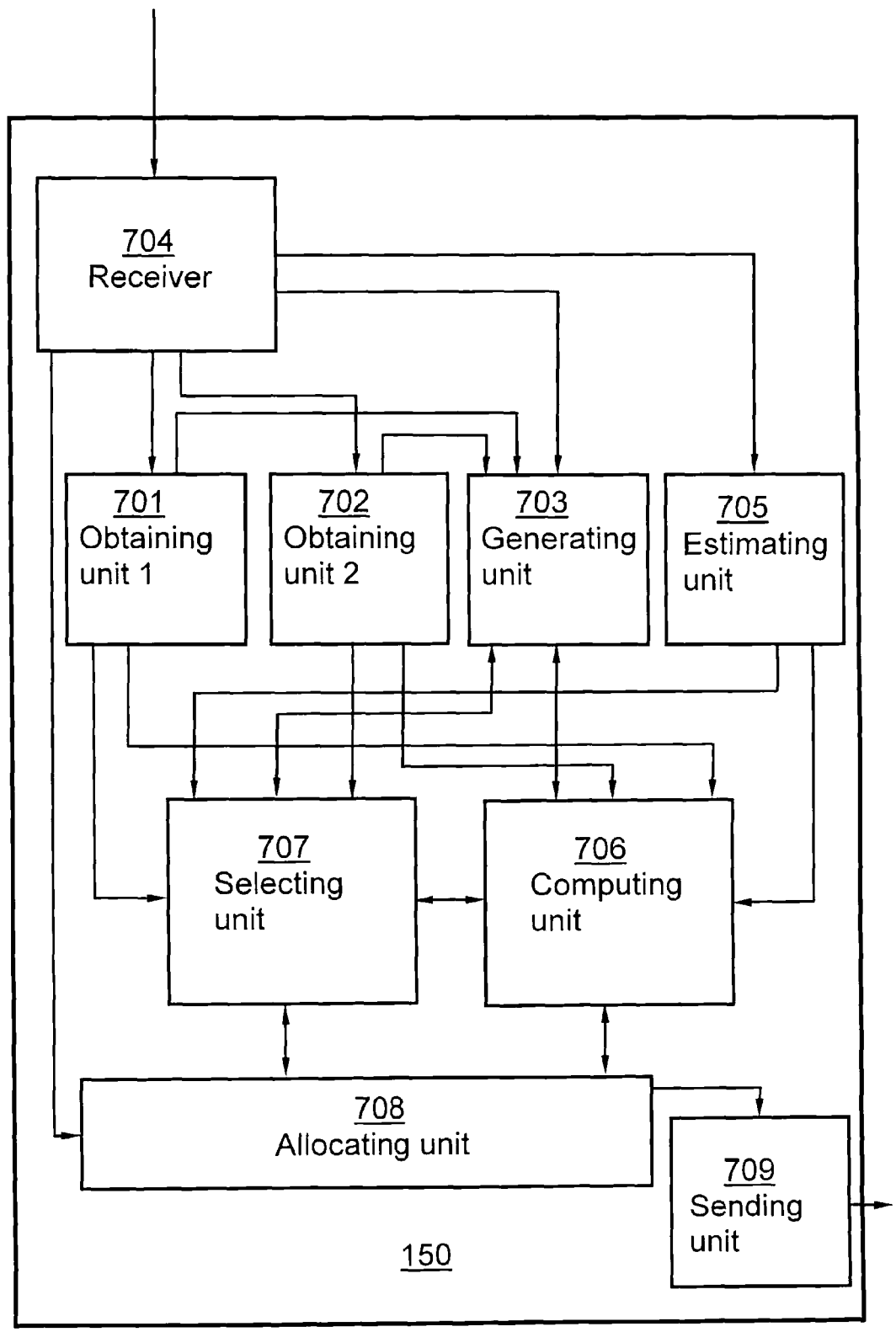
FIG. 7 is a block diagram illustrating an arrangement according to some embodiments.

FIG. 7 is a schematic block diagram illustrating an arrangement 150 in a first node 110 for allocating resource blocks 200 to at least one second node 120, 130. The second node 120, 130 is comprised within a wireless communication network 100. The first node 110 may be represented by a base station. The second node 120, 130, which may be represented by a user equipment such as e.g. a portable communication device, is adapted for wireless communication with the first node 110. The communication is performed over a channel by sending data comprised within the allocated resource blocks 200.

The arrangement 150 is adapted to perform the above described method steps 601-609, for allocating resource blocks 200 to the second node 120, 130 within the cell 140 in the wireless communication network 100.

The arrangement 150 comprises a generating unit 703. The generating unit 703 is adapted to generate at least one candidate SINR target value. Further, the arrangement 150 comprises an estimation unit 705. The estimation unit 705 is adapted to estimate the received signal power of each second node 120, 130, based on measurements made on a signal received from each second node 120, 130. The arrangement 150 also comprises a computing unit 706. The computing unit 706 is adapted to compute the number of resource blocks 200 possible to allocate to each second node 120, 130 for each generated candidate SINR target value. The calculation is based on the estimated received signal power of each second node 120, 130. Further yet, the arrangement 150 comprises a selecting unit 707. The selecting unit 707 is adapted to select a SINR target value out of the candidate SINR target values. Still further, the arrangement 150 comprises an allocating unit 708. The allocating unit 708 is adapted to allocate the computed number of resource blocks 200 to each second node 120, 130 for the selected SINR target value.

According to some optional embodiments, the arrangement 150 further may comprise a first obtaining unit 701. The first obtaining unit 701 may be adapted to obtain a minimum SINR target threshold value. Further yet, according to some embodiments, the arrangement 150 may comprise a second obtaining unit 702. The second obtaining unit 702 may be adapted to obtain a maximum SINR target threshold value. The arrangement 150 may also comprise a receiving unit 704. The receiving unit 704 may be configured to receive signals from other nodes 120, 130. Further yet, the arrangement 150 may comprise a sending unit 709. The sending unit 709 may be configured to send signals to other nodes 120, 130.

The sending unit 709 and the receiving unit 704 may according to some embodiments be comprised within one physical unit, a transceiver 704, 709 which may comprise a transmitter circuit 704 and a receiver circuit 709, which respectively transmits outgoing radio frequency signals to the second nodes 120, 130 and receives incoming radio frequency signals from the second nodes 120, 130 via an antenna. The antenna may be an embedded antenna, a retractable antenna or any antenna known to those having skill in the art without departing from the scope of the present invention. The radio frequency signals transmitted between the second nodes 120, 130 and the first node transceiver 704, 709 may include both traffic and control signals e.g., paging signals/messages for incoming calls, which are used to establish and maintain a voice call communication with another party or to transmit and/or receive data, such as SMS, e-mail or MMS messages.

For the sake of clarity and in order not to render unnecessary aggravating circumstances for the uninitiated reader to comprehend the present arrangement 150, any internal electronics of the arrangement 150, not completely necessary for performing the present method according to steps 601-609 has been omitted from FIG. 7.

It is to be noted that the described units 701-709 comprised within the first node 110 are to be regarded as separate logical entities but not with necessity separate physical entities. Any, some or all of the units 701-709 may be comprised or co-arranged within the same physical unit. However, in order to facilitate the understanding of the functionality of the arrangement 150 in the first node 110, the comprised units 701-709 are illustrated as separate physical units in FIG. 7.

Some Embodiments

The methods in the first node 110 for allocating resource blocks 200 may be implemented through one or more processors, together with computer program code for performing the functions of the methods. The program code mentioned above may also be provided as a computer program product, for instance in the form of a data carrier carrying computer program code for performing the method according to the present invention when being loaded into the first node 110. The data carrier may be a CD ROM disc, a memory stick, or any other medium such as a disk or tape that can hold machine readable data. The computer program code can furthermore be provided as pure program code on a server and downloaded to the first node 110 remotely.

Thus a computer readable medium encoded with a computer program for allocating resource blocks 200 may perform the method step according to steps 601-609.

As will be appreciated by one of skill in the art, the present invention may be embodied as a method in the first node 110, an arrangement 150 in the first node 110, or computer program products.

Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present methods may be written in any arbitrary programming language such as Java®, Smalltalk or C++. However, the computer program code for carrying out the steps of the present method may also be written in any conventional procedural programming languages, such as the "C" programming language and/or a lower level assembler language. The program code may execute entirely on the first node 110, partly on the first node 110, as a stand-alone software package, partly on the first node 110 and partly on a remote computing device or entirely on the remote computing device. In the latter scenario, the remote computing device may be connected to the first node 110 through a Local Area Network (LAN) or a Wide Area Network (WAN), or the connection may be made to an external computer, for example, through the Internet using an Internet Service Provider.

Furthermore, the present methods were described in part above with reference to flowchart illustrations and/or block diagrams of the first node 110, the second node 120, 130, methods, and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Concerning Used Terminology

Further, by means of example and in order to simplify the comprehension, the term SINR has been consistently used in this text when describing a Signal to Noise and Interference Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to Noise Ratio (SNR or S/N), Signal to Noise and Interference Ratio (SNIR), Signal to Interference Ratio (SIR) or an inversion of the ratio, like Interference to Signal Ratio, (ISR). The person skilled in the art immediately comprehends that any of these or similar ratios may be used in the context of this description instead of the SINR.

The terminology used in the detailed description of the particular exemplary embodiments illustrated in the accompanying drawings is not intended to be limiting of the invention. In the drawings, like numbers refer to like elements.

As used herein, the term "and/or" includes any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may be used herein to indicate that further features, similar to the ones that have just been enumerated, exist, which features however are well known to the person skilled in the art and for that reason omitted herein to not unnecessarily obscure the less initiated readers comprehension of the presented subject matter.

Functions or structures which are well known to the person skilled in the art may not be described in detail for brevity and/or clarity.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method in a first node for allocating resource blocks to each of one or more second nodes within a wireless communication network, each second node adapted to wirelessly communicate with the first node by sending data within the resource blocks allocated to that second node, wherein the method comprises:
generating a number of candidate Signal to Interference and Noise Ratio (SINR) target values based on a total number of resource blocks available for allocation to the one or more second nodes;
estimating, for each second node, a received signal power of the respective second node based on measurements made on a signal received from the respective second node;
computing, for each second node and for each candidate SINR target value, a candidate number of resource blocks allocable to the second node, based on the estimated received signal power of the respective second node;
selecting an SINR target value from the candidate SINR target values; and
for each second node, allocating, to the respective second node, the candidate number of resource blocks computed for the respective second node and the selected SINR target value.

2. The method according to claim 1, further comprising receiving a signal from second nodes that have data to send.

3. The method according to claim 1, wherein generating a number of candidate SINR target values is further based on at least one of the number of second nodes within a cell, the time of day, the amount of data transmitted, the expected amount of data to be transmitted, the number of privileged second nodes within a cell, the size of the wireless communication network, the radio conditions of one or more of the second nodes.

4. The method according to claim 1, wherein selecting an SINR target value comprises selecting the SINR target value to improve channel utilization, improve system throughput, reduce user delay on one or more of the second nodes, save power resources on one or more of the second nodes, reduce signal interference, increase bit rate, prioritize certain ones of the second nodes.

5. The method according to claim 1, further comprising sending an instruction to each second node that directs that second node to adjust its transmission power in order to achieve the selected SINR target value.

6. The method according to claim 1, wherein said allocating comprises:
allocating one or more resource blocks to a given second node;
determining if that given second node has more data to send than possible with the one or more allocated resource blocks;
if the given second node does have more data to send, determining if a resource block adjacent to the one or more allocated resource blocks is available;
if that adjacent resource block is available, determining if the selected SINR target value is reached by also allocating the adjacent resource block to the given second node; and
if the selected SINR target value is reached, allocating also the adjacent resource block to the given second node.

7. The method according to claim 6, further comprising, if the adjacent resource block is not available:
computing if the allocation of resource blocks to another second node occupying the adjacent resource block can be shifted to exclude that adjacent resource block without reducing the total number of bits to be transmitted; and
if the allocation can be shifted, shifting the allocation and re-allocating the adjacent resource block to said given second node.

8. The method according to claim 1, wherein the first node comprises a base station.

9. The method according to claim 1, wherein the second node comprises a portable communication device.

10. An arrangement in a first node for allocating resource blocks to each of one or more second nodes within a wireless communication network, the one or more second nodes each adapted to wirelessly communicate with the first node by sending data within the resource blocks allocated to that second node, wherein the arrangement comprises:
a generating unit adapted to generate a number of candidate Signal to Interference and Noise Ratio (SINR) target values based on a total number of resource blocks available for allocation to the one or more second nodes;
an estimation unit adapted to estimate a received signal power of each second node based on measurements made on a signal received from the respective second node;
a computing unit adapted to compute, for each second node and for each candidate SINR target value, a candidate number of resource blocks allocable to the respective second node, based on the estimated received signal power of the respective second node;
a selecting unit adapted to select an SINR target value from the candidate SINR target values; and
an allocating unit adapted to, for each second node, allocate to the respective second node, the candidate number of resource blocks computed for the respective second node and the selected SINR target value.

11. The arrangement according to claim 10, wherein the estimation unit is adapted to estimate a received signal power of each second node based on measurements made on a signal received from a second node that has data to send.

12. The arrangement according to claim 10, wherein the generating unit is adapted to generate a number of candidate SINR target values further based on at least one of the number of second nodes within a cell, the time of day, the amount of data transmitted, the expected amount of data to be transmitted, the number of privileged second nodes within a cell, the size of the wireless communication network, the radio conditions of one or more of the second nodes.

13. The arrangement according to claim 10, wherein the selecting unit is adapted to select the SINR target value to improve channel utilization, improve system throughput, reduce user delay on one or more of the second nodes, save power resources on one or more of the second nodes, reduce signal interference, increase bit rate, prioritize certain ones of the second nodes.

14. The arrangement according to claim 10, further comprising a sending unit configured to send an instruction to each second node that directs that second node to adjust its transmission power in order to achieve the selected SINR target value.

15. The arrangement according to claim 10, wherein the allocating unit is configured to:
allocate one or more resource blocks to a given second node;
determine if that given second node has more data to send than possible with the one or more allocated resource blocks;
if the given second node does have more data to send, determine if a resource block adjacent to the one or more allocated resource blocks is available;
if that adjacent resource block is available, determine if the selected SINR target value is reached by also allocating the adjacent resource block to the given second node; and
if the selected SINR target value is reached, allocate also the adjacent resource block to the given second node.

16. The arrangement according to claim 15, wherein the allocating unit is further configured to, if the adjacent resource block is not available:
compute if the allocation of resource blocks to another second node occupying the adjacent resource block can be shifted to exclude that adjacent resource block without reducing the total number of bits to be transmitted; and
if the allocation can be shifted, shift the allocation and re-allocate the adjacent resource block to said given second node.

17. The arrangement according to claim 10, wherein the first node comprises a base station.

18. The arrangement according to claim 10, wherein the second node comprises a portable communication device.

* * * * *

UNITED STATES PATENT AND TRADEMARK OFFICE
CERTIFICATE OF CORRECTION

| | |
|---|---|
| PATENT NO. | : 8,483,737 B2 |
| APPLICATION NO. | : 12/991513 |
| DATED | : July 9, 2013 |
| INVENTOR(S) | : Englund et al. |

It is certified that error appears in the above-identified patent and that said Letters Patent is hereby corrected as shown below:

In the Specification

In Column 3, Line 20, delete "bends," and insert -- bands, --, therefor.

In Column 3, Line 28, delete "flaw" and insert -- have --, therefor.

In Column 3, Line 33, delete "Interference" and insert -- interference --, therefor.

Signed and Sealed this
Eleventh Day of February, 2014

Michelle K. Lee
*Deputy Director of the United States Patent and Trademark Office*